(12) United States Patent
Wei et al.

(10) Patent No.: US 7,164,134 B2
(45) Date of Patent: *Jan. 16, 2007

(54) HIGH PERFORMANCE CT REFLECTOR FOR A SCINTILLATOR ARRAY AND METHOD FOR MAKING SAME

(75) Inventors: Chang Wei, Niskayuna, NY (US); Robert Joseph Lyons, Burnt Hills, NY (US); Richard Louis Hart, Albany, NY (US); Jaime Andres Echeverry, Troy, NY (US); Wendy Wen-Ling Lin, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 77 days.

This patent is subject to a terminal disclaimer.

(21) Appl. No.: 10/632,277

(22) Filed: Aug. 1, 2003

(65) Prior Publication Data

US 2005/0023472 A1    Feb. 3, 2005

(51) Int. Cl.
*G01T 1/202* (2006.01)
*G01T 1/24* (2006.01)
*G01N 23/083* (2006.01)
*H05G 1/64* (2006.01)

(52) U.S. Cl. ............... 250/368; 250/370.11; 378/19; 378/98.8

(58) Field of Classification Search ............ 250/361 R, 250/367–368, 370.09, 370.11, 483.1, 486.1, 250/487.1; 427/123, 126.1; 378/19, 98.8
See application file for complete search history.

(56) References Cited

U.S. PATENT DOCUMENTS 3,983,266 A    9/1976    Bahls
4,720,426 A    1/1988    Englert et al.
5,179,284 A  * 1/1993    Kingsley et al. ............ 250/368
5,232,492 A    8/1993    Krulik et al.
5,378,894 A  * 1/1995    Akai ........................... 250/368
6,180,524 B1 * 1/2001    Ferrell ........................ 438/687
6,455,175 B1   9/2002    Kozlov et al.
2002/0196628 A1* 12/2002 Yoshida et al. ............. 362/296

FOREIGN PATENT DOCUMENTS

JP    04074870 A  *  3/1992

* cited by examiner

*Primary Examiner*—David Porta
*Assistant Examiner*—Frederick F. Rosenberger
(74) *Attorney, Agent, or Firm*—Jenifer E. Haeckl; Jean K. Testa

(57) ABSTRACT

An apparatus and method for fabricating a high performance reflective material for use on scintillator elements in a computed tomograph (CT) imaging device. Adjacent scintillator elements are separated by gaps filled with a reflective coating layer. In one embodiment, the reflective coating layer consists of a surface level coating layer, an adhesion layer, a metallic reflective layer, and a top layer consisting of either a barrier coating layer or a polymeric encapsulant, or both. In another embodiment, the metallic reflective coating layer is applied to the scintillator element via an electroless metal deposition process utilizing a reducing agent and a metal complex. The CT reflectors formed by either embodiment have improved light output, minimized cross talk, higher geometric efficiency, and decreased performance degradation as compared with current CT reflectors that utilize organic binders and titanium dioxide fillers is achieved.

37 Claims, 1 Drawing Sheet

HIGH PERFORMANCE CT REFLECTOR FOR A SCINTILLATOR ARRAY AND METHOD FOR MAKING SAME

TECHNICAL FIELD

The present invention relates generally to a solid state X-ray detectors and more specifically to a high performance CT reflector for a scintillator array and method for forming same.

BACKGROUND ART

In at least some computed tomograph (CT) imaging system configurations, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. X-ray sources typically include x-ray tubes, which emit the x-ray beam at a focal spot. X-ray detectors typically include a collimator for collimating x-ray beams received at the detector, a scintillator adjacent the collimator, and photodiodes adjacent the scintillator.

The scintillator material converts X-ray radiation into nearly monochromatic (in the case of HiLite scintillators, commercially made by General Electric Medical Systems) visible light, which is then fed to photodiodes for imaging purposes. In order to achieve high-resolution images, the scintillator material is often diced into small pieces and assembled in a pixilated array with desired geometry prior to attaching to the photodiode. Reflector materials are used between the pixels to prevent light penetration from one pixel to another and to enhance light output of each unit, and thus improve imaging resolution. Light-absorbing materials are also typically added to further minimize cross talk among pixels.

Currently, CT reflector materials consist of organic resin (binders) and titanium dioxide ($TiO_2$) fillers (reflective materials). In addition, chromium compounds are added to the matrix as absorbing materials to minimize cross talk. These are also known as cast reflectors. However, there are several deficiencies associated with these systems.

For example, systems utilizing chromium materials have relatively low light output due to the chromium based materials. Also, these systems have relatively high cross talk. Further, there is low geometric efficiency due to the inherent thickness of the reflector. Finally, there is performance degradation under X-ray radiation because of the organic matrix.

In the past, silver was investigated as a potential replacement for titanium dioxide-based reflectors. In theory, silver allows for a much thinner reflector (less than about 10 microns), thereby making a reflector with higher reflectance, minimal cross talk, and no significant degradation under X-ray radiation. However, direct application of silver coatings (i.e. sputtered silver) onto scintillator materials resulted in low light output and undesired adhesion properties. On the other hand, silver opticlad, a commercial product based on silver reflectors and described in U.S. Pat. No. 4,720,426, which is herein incorporated by reference, gave a good initial performance but failed eventually due to silver degradation over time.

There is therefore a need to develop new CT reflectors having enhanced performance.

SUMMARY OF THE INVENTION

The present invention proposes different methods in which to improve CT reflector performance.

In one method, a metallic-based CT reflector is formed on the scintillator by first applying a surface-leveling, or smooth, coating to the surface of the scintillator exposed on the top and within the gap between scintillator elements. This smooth coating should be transparent to the emission wavelengths of the scintillator and have as low a refractive index as practicable. Next, an argon plasma etching of the coating is applied to the coating layer. A thin layer of an adhesion promoter is then applied to the etched surface of the coating layer. Next, a layer of metal, preferably silver, is applied onto the adhesion promoter layer by thin film deposition techniques such as sputtering, chemical vapor deposition, aqueous chemical reduction, or physical vapor deposition. Finally, a metallic, inorganic or ceramic barrier layer coated with an optional polymeric encapsulant is applied to protect the metallic layer from degradation.

The resultant CT reflector of the preferred embodiments has improved light output, minimized cross talk, higher geometric efficiency, and decreased performance degradation as compared with current CT reflectors that utilize organic binders and titanium dioxide fillers.

Other objects and advantages of the present invention will become apparent upon the following detailed description and appended claims, and upon reference to the accompanying drawings.

DETAILED DESCRIPTION OF THE PREFERRED EMBODIMENT

Figure 1:
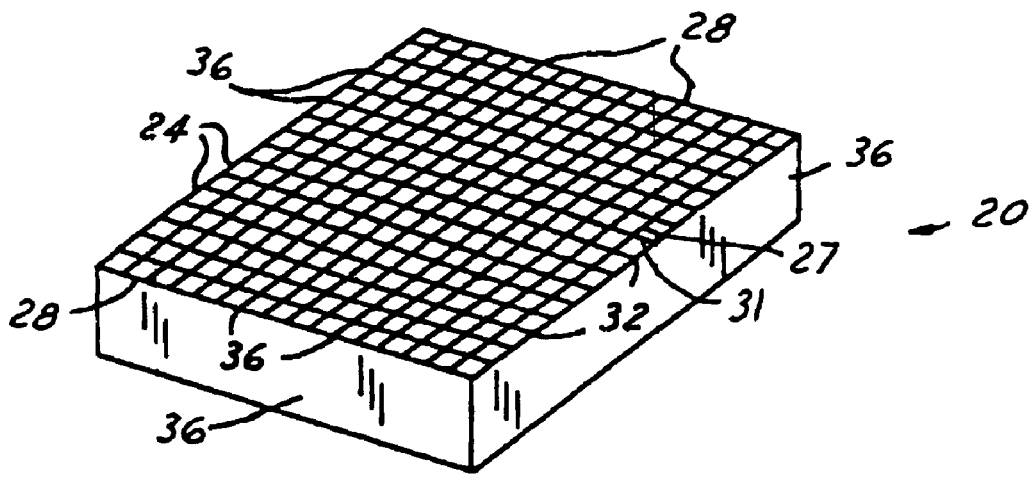
FIG. 1 is a perspective view of a scintillator array having a metallic reflector coating according to a preferred embodiment of the present invention.

FIG. 1 is a perspective view of a scintillator 20 preferably for use in a CT reflector including a plurality of scintillator elements 24 which are laid out in an array having first gaps 28 and second gaps 32. To increase the spatial resolution and the strength of a signal supplied to a photodiode located adjacent one of scintillator elements 24, the surfaces 27 and 31 contained within gaps 28 and 32 and the top surface 33 of the scintillator elements 24 are filled with a reflective material 36. The width of gaps 28 and 32 may range from about 10 to 160 micrometers, i.e., about 0.5 to 6 mils. Reflective material 36 is cast on the adjacent surfaces 27, 31, 33 of elements 24 so that more of the light signal generated by elements 24 is properly reflected.

The scintillator elements 24 for use in FIG. 1 are formed from a wide variety of scintillator materials as is well known in the art. These materials include medical imaging scintillators made of rare earth oxides or gadolinium oxysulfide, as well as single crystals of cesium iodide, bismuth germanate or lutetium silicate. In addition, scintillators used primarily in physics research such as lead tungstate and sodium iodide are also applicable. One commercially available scintillator material is HiLite, available from General Electric Medical Systems.

Alternatively, the scintillator material 24 may be formed of transparent rare earth garnet ceramic material having the formula:

$(G_{1-x-y}A_xRe_y)_wD_zO_{12}$ where G is at least one metal selected from the group consisting of Tb and Lu; A is at least one rare earth metal selected from the group of Y, La, Gd, Lu and Yb when G is Tb; A is at least one rare earth metal selected from the group of Y, La, Gd, Tb and Yb when G is Lu; Re is at least one rare earth metal selected from the group consisting of Ce, Pr, Nd, Sm, Eu, Dy, Ho, Er, and Tm; D is at least one metal selected from the group consisting of Al, Ga, and In; w is a range from about 2.8 up to about and including 3.1%; x is in the range from 0 to about and including 0.5%; y is in the range from 0.0005 to about and including 0.2%; and z is in the range from 4.0 to about and including 5.1%.

Two preferred ceramic garnets that may be formed from the above general formula for use as scintillator materials 24 include terbium aluminum garnet ("TAG") $(Tb_{2.992}Ce_{0.012}Al_{4.996}O_{12})$ and terbium lutetium aluminum garnet ("LuTAG") $(Tb_{2.198}Lu_{0.8}Ce_{0.01}Al_{4.992}O_{12})$.

In the case of single crystal scintillator materials such as cesium iodide (CsI), the crystals are oriented perpendicular to the plane of the glass substrate panel (not shown) and they act as short optical fibers to ensure that light photons originating in the crystals exit at its ends of the crystals and into its amorphous silicon array (not shown), rather than propagating within the CsI layer.

Figure 2:
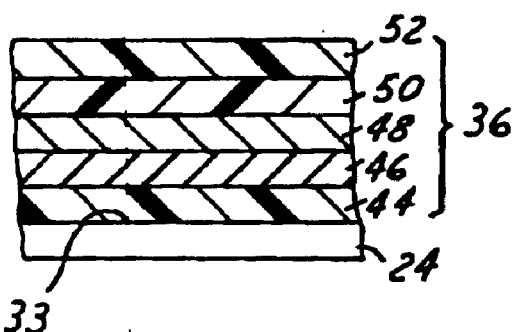
FIG. 2 is a section view of a scintillator element of FIG. 1 according to one preferred embodiment of the present invention.

In one preferred embodiment, as shown in FIG. 2, the reflector material 36 includes a smoothening layer 44 and an adhesion layer 46 coated to the surfaces 27, 31, 33 of each scintillator element 24. For ease of understanding, only the top surface 33 is shown coated with the reflector material 36 in FIG. 2 (and in FIGS. 3 and 4 below). A metallic reflector layer 48 is then applied to the layer 46. The metallic reflector layer 48 is then coated with a top layer 49 consisting of a barrier layer 50 and an optional polymeric encapsulant 52.

To form the reflective layer 36, a smoothening layer 44 is first introduced to reduce surface roughness on the respective surface 27, 31, 33 of the adjacent scintillator material 24 within the gaps 28, 32. This additional smoothness affects subsequently applied layers, including the metallic reflector layer 48. The increased smoothness of the silver layer results in higher reflectance obtained by the metallic reflector layer 48. For the purposes of the present invention, by definition, a smoothening layer 44 may also be used interchangeably with a surface-leveling layer.

The smoothening layer 44 preferably is transparent to the emission wavelengths of the scintillator material 24 and has as low a refractive index as practicable. The smoothening layer 44 may be applied using a spin coating process and candidates for the smoothening layer are low viscosity polymer materials including silicone hardcoats (SHC), styrene acrylate coatings, ultraviolet (UV) curable hardcoats (UVHC), Epotek (manufactured by Epoxy Technologies of Billereca, Mass.), Hysol® (manufactured by Henkel Loctite Corporation of Rocky Hill, Conn.), Saran (trademark of The Dow Chemical Company) oligomer coatings, and other polymeric and inorganic materials that exhibit the desired performance characteristics in terms of optical (refractive index, absorption) and physical properties (thermal stability).

In order to enhance the adhesion between the smoothening layer 44 and metallic reflector layer 48, the surface of the smoothening layer 44 is first etched in a plasma-etching step, and more preferably is etched in an argon plasma-etching step.

Next, a thin adhesion layer 46 of less than 200 Angstroms, and more preferably about 10 Angstroms is applied to the etched smoothening layer 44. Preferably, the adhesion layer is a titanium adhesion layer. However, other adhesion promoting materials include aluminum, tungsten, chromium, and zirconium adhesion layers.

The metallic reflector layer 48 is formed of materials that have high reflectivity at the wavelengths of light emitted by the scintillator elements 24. For example, ultraviolet-light emitting scintillator elements 24 would require a material that reflects ultraviolet light, such as aluminum. For scintillator elements that emit red or infrared light, gold metallic layers are desirable due to its high reflectivity in these spectral regions.

One preferred material for the metallic reflector layer 48 is silver. However, other metals that may be used include gold, copper, rhodium, magnesium, and aluminum. The metallic reflector layer 48 is applied to a thickness of at least 500, and more preferably between 2000 to 3000 Angstroms, by techniques well known to those of ordinary skill in the art depending upon the composition of the metallic reflective layer. For example, the metallic layer may be deposited by chemical vapor deposition (CVD), physical vapor deposition (PVD), sputtering, or via chemical reduction from a liquid phase.

For example, when the metallic reflective layer 48 of FIG. 2 is as a silver reflective layer formed via a chemical reduction from liquid phase, the process begins by first applying a reducing agent onto the smoothening layer 44. The reducing agent may be an aqueous solution of glucose or an aqueous solution of a Rochelle salt. The reducing agent is degassed by exposure to a vacuum (not shown) to remove any bubbles between the scintillator elements defining the gaps 28, 32. A layer of silver amine complex is then applied to the reducing agent. When the deposition is complete, the excess solutions are then removed from the scintillator material 24, leaving the silver reflective layer 48 on the adhesion layer 46 covering the smoothening layer 44 and scintillator element surfaces 27, 31, 33. The scintillator elements 24 are then washed and dried.

In an alternative preferred method of forming a silver reflective layer 48 of FIG. 2 via a chemical reduction from liquid phase, the reducing agent solution and silver amine complex solution are first mixed together prior to applying the solution to the surface of the etched smoothening layer 44. The applied mixed solution is then degassed by exposure to a vacuum as above. When the deposition is complete, the excess mixed solution is then removed from the scintillator material 24, therein leaving a silver reflective layer 48 layer formed on the adhesion layer 46 covering the smoothening layer 44 and scintillator element surfaces 27, 31, 33. The scintillator elements 24 are then washed and dried.

The barrier layer 50 preferably consists of a metallic, inorganic or ceramic barrier coating applied to the metallic reflector layer 48 at a thickness of a minimum of 500, and more preferably between about 1000 to 5000, Angstroms.

An optional layer of polymeric encapsulant 52 may be applied to the metallic or barrier coating 50 that serves as an environmental barrier depending upon the composition of the metallic reflector layer 48. The encapsulant 52 candidates are applied to a thickness of about 5 to 10 micrometers and include but are not limited to UV hardcoats, styrene acrylate coatings, Saran (trademark of The Dow Chemical Company) oligomer coatings, and amorphous Teflon coatings.

Figure 3:
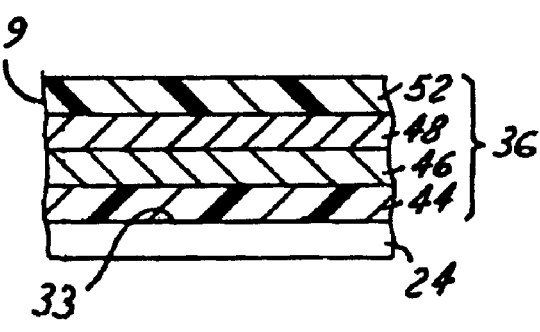
FIG. 3 is a section view of a scintillator element of FIG. 1 according to another preferred embodiment of the present invention.

In another alternative embodiment, as shown in FIG. 3, the top layer 49 of the reflective layer 36 consists of a polymeric encapsulant 52 applied directly to the metallic reflective layer 48 without the need for the barrier layer 50.

Examples 1–4 below illustrate performance characteristics for scintillators 24 formed as described above in FIGS. 1–3.

EXAMPLE 1

Silver Top Reflector Performance

HiLite was used as scintillator material and a silver reflector was applied to the top surface of a production HiLite pack. Since HiLite stops 90% of the X-rays in the top one third of the reflector pixels, increasing the reflectivity of the top surface should vastly increase the light output. In this case, the top surface of the production pack was ground off with 1200 grit polishing paper on a polishing wheel, and replaced with a silicon hardcoat as surface leveling layer. The silicon hardcoat was applied by spinning coating process to a thickness of about 2 to 5 microns. The pack was then cured in an oven at 85 C for 24 hours. A silver layer (about 2800 Angstroms thick) was then sputtered onto the surface leveling layer. Light output data showed 13% improvement with silver top reflector compared to a top $TiO_2$ reflector layer.

EXAMPLE 2

Silver Side Reflector Performance

Silver reflectors were also applied to HiLite bars and slices to construct silver side reflectors. In this case, a spin coating chuck was created to coat bars and slices with a silicone hard coat surface-leveling layer. Eight slices were coated with silver on both Z-direction sides, and incorporated into one half of a cast reflector pack. This structure resulted in silver reflectors in the Z-direction only with the half of the pack. The corresponding light output measurements showed 5.4%–8.4% light output increase along with a 21% reduction in crosstalk for the half of the pack coated with silver in the Z-direction.

EXAMPLE 3

Adhesion Performance

Adhesion between silver and a silicone hard coating surface leveling layer (SHC) or an ultraviolet curable hardcoat (UVHC) was unsatisfactory while the silver layer was directly sputtered to surface leveling layer surface. To enhance interfacial adhesion, a plasma argon etching step (Ar etch) was first applied to the surfacing leveling layer for 2 minutes at 0.5 kV and 10 micron to clean the surface. Next, a 10-Angstrom thick layer of titanium was sputtered (1.5 kW @ 90 cm/min 20 micron) onto the surface leveling layer as an adhesion enhancing interlayer prior to silver sputtering. A simple scotch tape test was performed for adhesion evaluation, and the corresponding results were listed in Table 1. As seen, with the procedure described above, adhesion between silver and the surface-leveling layer was greatly improved. The results also showed a minimal optical effect caused by the titanium adhesion interlayer.

TABLE 1

Adhesion Results for Silver Reflectors

| Smoothening layer | Adhesion Promoter | Result of Tape Test |
|---|---|---|
| SHC | none | Failed |
| SHC | Ar Etch | Some Improvement |
| SHC | Ti | Some Improvement |
| SHC | Ar Etch + Ti | Success |
| UVHC | none | Failed |
| UVHC | Ti | Some Improvement |
| UVHC | Ar Etch | Some Improvement |
| UVHC | Ar Etch + Ti | Success |

EXAMPLE 4

Environmental Stability

Environmental stability is an important issue for silver-based reflector layer 48, and thus a barrier layer 50 is preferably applied to protect silver reflector layer 48 from degradation. The barrier layer 50 in this example consists of a 1000 Angstrom thick titanium layer 50 followed by a 5-micrometer thick encapsulant layer 52 of UVHC 8558 (manufactured by General Electric Silicone). The environmental stability test was performed at 98 degrees Celsius and 100% relative humidity. There was no visual coating delamination/cracking after 500 hours of testing under the above conditions. The corresponding reflectivity measurements showed no degradation over the testing period. Thus, with a bilayer barrier coating structure, silver degradation over time can be prevented.

Figure 4:
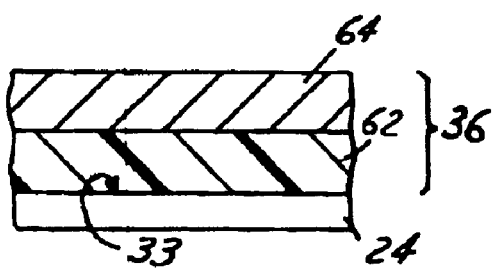
FIG. 4 is a section view of a scintillator element of FIG. 1 according to another preferred embodiment of the present invention.

FIG. 4 below illustrates another preferred method for forming a reflective layer 36 for use on the scintillator arrays 24. In this embodiment, the reflective layer 36 is applied to the scintillator element 24 surfaces 27, 31, 33 via an electroless metal deposition process. The scintillator elements 24 preferred for use in these embodiments are the transparent rare earth garnet ceramic materials described above, although many of the other types of scintillator elements described above may also be utilized.

Referring now to FIG. 4, the metallic layer 64 preferably is formed using a reducing agent and silver amine complex. The surfaces 27, 31, 33 of the scintillator array elements 24 are first covered with a smoothening coating 62. The reducing agent is then applied to the smoothening coating 62. The reducing agent may be an aqueous solution of glucose or an aqueous solution of Rochelle salt. The reducing agent is degassed by exposure to a vacuum (not shown) to remove any bubbles between the scintillator elements 24. A layer of silver amine complex is then applied to the reducing agent. After deposition is complete, the liquid components of the reducing agent and silver amine complex are removed, leaving the metallic reflective layer 64 applied onto the smoothening layer 62. The scintillator elements 24 having the reflective material 36 are then washed and dried.

While the embodiment as shown in FIG. 4 preferably utilize silver to form the metallic layer 64, it is contemplated that other types of metals may be used to form mirror reflective layers 36 of the surface of the scintillator elements 24. These metals include but are not limited to gold, copper, noble metals, rhodium and other platinum metals. These metals can be applied as described above utilizing similar techniques as described above in FIG. 4 with different complexing solutions. For example, gold may be applied to the reducing agent in the form of a gold cyanide or gold thiosulfate complex similar to that described in U.S. Pat. No. 5,232,492 to Krulik et al., which is herein incorporated by reference. Similarly, rhodium metal may be applied to the reducing agent via an electroless plating process similar to that described in U.S. Pat. No. 6,455,175, to Kozlov et al., which is herein incorporated by reference.

The process for forming the reflective scintillator array 24 having the reflective coating 36 according to the methods of FIGS. 1–4 is advantageous for a number of reasons. First, the ability to deposit silver or other metallic reflective coating 36 inside of gaps 28, 32 that are less than 1 millimeter wide and several millimeters deep allows the scintillators 24 to be formed as a unit, rather than by assembling each individual array. This is cost effective, because arrays can be preformed in any number of size and array patterns. In addition, the reflective coating 36 is opaque in transmission, thereby eliminating optical crosstalk between array elements 24.

While one particular embodiment of the invention have been shown and described, numerous variations and alternative embodiments will occur to those skilled in the art. Accordingly, it is intended that the invention be limited only in terms of the appended claims.

What is claimed is:

1. A high performance reflector system for use on scintillator elements contained in a scintillator array of a computed tomograph imaging system, the scintillator elements having a reflective material coupled along its surfaces defined within the gaps between scintillator elements, the reflective material comprising:

A smoothening layer applied to a top surface and to each of four adjacent side surfaces of each of a plurality of said scintillator elements;

A metallic reflective layer applied to said smoothening layer; and

A top layer applied to said metallic reflective layer, said top layer providing an environmental barrier to said metallic reflective layer, and wherein the scintillator array is two-dimensional (2D).

2. The reflective material of claim 1, wherein said smoothening layer comprises an etched smoothening layer.

3. The reflective material of claim 1 further comprising an adhesion layer applied between said smoothening layer and said metallic reflective layer.

4. The reflective material of claim 3, wherein said adhesion layer has a thickness of less than about 200 Angstroms.

5. The reflective material of claim 3, wherein said adhesion layer is selected from the group consisting of a titanium adhesion layer, an aluminum adhesion layer, a tungsten adhesion layer, a chromium adhesion layer, and a zirconium adhesion layer.

6. The reflective material of claim 1, wherein said smoothening layer has a thickness of about 2 to 10 microns.

7. The reflective material of claim 1, wherein said smoothening layer comprises a low viscosity polymer material, said polymer material being transparent to the emission wavelengths of said plurality of scintillator elements.

8. The reflective material of claim 7, wherein said low viscosity polymer material is selected from the group consisting of silicone hardcoats, styrene acrylate coatings, ultraviolet curable hardcoats, and polyvinylidene chloride.

9. The reflective material of claim 1, wherein said metallic reflective layer has a thickness of at least 500 Angstroms.

10. The reflective material of claim 1, wherein said metallic reflective layer has a thickness of between about 2000 and 3000 Angstroms.

11. The reflective material of claim 1, wherein said metallic reflective layer is selected from the group consisting of a silver reflective layer, a gold reflective layer, a copper reflective layer, a rhodium reflective layer, a magnesium reflective layer, and an aluminum reflective layer.

12. The reflective material of claim 1, wherein said top layer comprises a barrier coating layer applied to a thickness of at least 500 Angstroms.

13. The reflective material of claim 1, wherein said top layer comprises a barrier coating layer applied to a thickness of between about 1000 and 5000 Angstroms.

14. The reflective material of claim 1, wherein said top layer comprises a barrier coating layer, said barrier coating layer selected from the group consisting of a metallic barrier coating layer, an inorganic barrier coating layer, and a ceramic barrier coating layer.

15. The reflective material of claim 14, wherein said top layer further comprises a polymeric encapsulant applied to said barrier coating layer.

16. The reflective material of claim 15, wherein said polymeric encapsulant has a thickness of between approximately 5 and 10 micrometers.

17. The reflective material of claim 15, wherein said polymeric encapsulant is selected from the group consisting of a ultraviolet cured hardcoat, a styrene acrylate encapsulant, a polyvinylidene chloride encapsulant, and an amorphous polytetrafluoroethylene encapsulant.

18. The reflective material of claim 1, wherein said top layer comprises a polymeric encapsulant having a thickness of between approximately 5 and 10 micrometers.

19. The reflective material of claim 18, wherein said polymeric encapsulant is selected from the group consisting of a ultraviolet cured hardcoat, a styrene acrylate encapsulant, a polyvinylidene chloride encapsulant, and an amorphous polytetrafluoroethylene encapsulant.

20. A method for forming a high performance reflector for a 2-dimensional scintillator array used in a computed tomograph imaging system, the high performance reflector having a plurality of scintillator elements formed hi an array, the method comprising:

applying a smoothening layer to a top surface and to each of four adjacent side surfaces of each of said plurality of scintillator elements;

optionally etching said smoothening layer;

optionally applying an adhesion layer to said smoothening layer;

applying a metallic reflective layer to said adhesion layer; and applying a top layer to said metallic reflective layer, said top layer providing an environmental barrier to said metallic reflective layer.

21. The method of claim 20, wherein applying a smoothening layer comprises spin coating said surface with a low viscosity polymer material, said low viscosity polymer material being selected from the group consisting of silicone hardcoats, styrene acrylate coatings, ultraviolet curable hardcoats, transparent low refractive index epoxy materials, and polyvinylidene chloride.

22. The method of claim 20, wherein optionally etching said smoothening layer comprises optionally argon plasma etching said smoothening layer.

23. The method of claim 20, wherein applying said metallic reflective layer comprises sputtering said metallic reflective layer onto said smoothening layer.

24. The method of claim 20, wherein applying said metallic reflective layer comprises depositing said metallic reflective layer onto said smoothening layer using a chemical vapor deposition technique.

25. The method of claim 20, wherein applying said metallic reflective layer comprises depositing said metallic reflective layer onto said smoothening layer using a physical vapor deposition technique.

26. The method of claim 20, wherein applying said metallic reflective layer comprises depositing said metallic reflective layer onto said smoothening layer using a chemical reduction from a liquid phase technique.

27. A scintillator for use in a computed tomograph application comprising:
 a plurality of scintillator elements formed into an array, each of said plurality of scintillator elements having a top surface and four adjacent side surfaces;
 a smoothening layer applied to said top surface and to each of said four adjacent side surfaces; and
 a metallic reflective coating applied to said smoothening layer, said metallic reflective coating formed from a reducing agent and a metal complex, and wherein the plurality of the scintillator elements are formed into a two-dimensional (2D) array.

28. The scintillator of claim 27, wherein said metal complex comprises a silver amine complex.

29. The scintillator of claim 27, wherein said metal complex is selected from the group consisting of a gold cyanide complex and a gold thiosulfate complex.

30. The scintillator of claim 27, wherein said metal complex comprises a rhodium metal complex.

31. The scintillator of claim 27, wherein said reducing agent comprises an aqueous solution of glucose.

32. The scintillator of claim 27, wherein said reducing agent comprises an aqueous solution of a Rochelle salt.

33. The scintillator of claim 27, wherein said metal complex comprises a copper amine complex.

34. A method for forming a high performance reflector for a two-dimensional (2D) scintillator array used in a computed tomograph imaging system, the 2D scintillator array having a plurality of scintillator elements forming a 2D array, the method comprising:
 applying a smoothening coating to a top surface and to each of four adjacent side surfaces of each of said plurality of scintillator elements;
 applying a reducing agent to said smoothening coating;
 degassing said reducing agent;
 applying a metal complex solution to said reducing agent to form a metal reflecting layer; and
 washing and drying said metal reflecting layer.

35. The method of claim 34, wherein said reducing agent comprises an aqueous solution of glucose.

36. The method of claim 34, wherein said reducing agent comprises an aqueous solution of a Rochelle salt.

37. The method of claim 34, wherein said reducing agent and said metal complex solution are mixed to form a mixture prior to applying said reducing agent and said metal complex solution to said smoothening coating.

* * * * *